Re 13986 9-21-1915
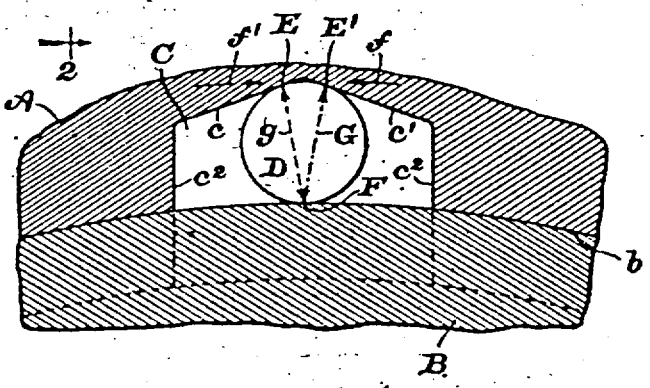

UNITED STATES PATENT OFFICE.

EDWARD W. TAYLOR, OF SALT LAKE CITY, UTAH.

NUT-LOCK.

13,986. Specification of Reissued Letters Patent. Reissued Sept. 21, 1915.

Original No. 1,024,107, dated April 23, 1912, Serial No. 642,708. Application for reissue filed December 21, 1914. Serial No. 878,453.

*To all whom it may concern:*

Be it known that I, EDWARD W. TAYLOR, a citizen of the United States, and a resident of Salt Lake City, in the county of Salt Lake and State of Utah, have invented certain new and useful Improvements in Nut-Locks; and I do hereby declare that the following is a full, clear, and exact description thereof, reference being had to the accompanying drawings, and to the letters of reference marked thereon, which form a part of this specification.

This invention relates to an improvement in nut locks, and consists of the matters hereinafter described and more particularly pointed out in the appended claims.

The invention relates to the type of nut lock described in Letters Patent No. 974,842, granted to me on November 8th, 1910.

Referring to the drawings—Figure 1 is a view representing a top plan of a nut applied to a screw threaded bolt and provided with my improved nut lock; Fig. 2 is a view representing a vertical section through Fig. 1 in a plane indicated by the line 2—2 thereof; Fig. 3 is a magnified detail view in cross section illustrating the operation of my improved nut lock; Fig 4 is a view similar to Fig. 1, showing a modified form of construction.

Referring now to the drawings, and particularly to Figs. 1 to 3, inclusive, A indicates a nut, and B, a screw or bolt which is provided with a screw thread *b* adapted to be engaged by an internal screw thread *a* formed in the bore of the nut.

C indicates a groove in the bore of the nut extending longitudinally through the nut parallel to its longitudinal central axis. Said groove has a bottom having oppositely inclined flat or plane surfaces *c*, *c'*, intersecting each other, as shown in the drawings, along a line at the deepest part of the groove. Said groove has lateral surfaces $c^2$, $c^2$. D indicates a pin extending longitudinally through said groove and engaging at one side against the peripheral edges of the screw threads *b* of the bolt and at its other side against both of the inclined flat or plane surfaces *c*, *c'*, forming the bottom surface of the groove. Each of the plane surfaces *c*, *c'* is tangential to the cylindric surface of the pin which engages said surfaces along separated, parallel lines E, E', extending parallel to the longitudinal central axis of the bore of the nut. The pin at its opposite side nearest the central axis of the nut has contact with the peripheral edges of the screw threads, engaging each of said threads at points lying in a line F, extending parallel to the central axis of the bore of the nut.

The dotted line G, *g*, in Fig. 3, represent the shortest distances respectively between the lines of contact of the pin with the flat surfaces *c*, *c'* and with the screw threads of the bolt and also represent the lines of compressive strain exerted through the pin in the action of the device to prevent the turning of the nut, as will be presently described. It will be noted that these distances are shorter than the diameter of the pin since the lines G, *g*, are chords of a circle extending from a point in the line (F) of contact of the pin with the screw thread of the bolt to points in the lines (E, E',) of contact with the oppositely inclined surfaces *c*, *c'*, which points are spaced either side of the diameter containing the point in the line (F) of contact of the pin with said screw threads.

The operation of my improved nut lock is as follows: If the nut tends to rotate in the direction of the arrow *f*, it will, by reason of the frictional grip of the flat inclined surface *c'* of the groove upon the cylindric surface of the pin along the contact line E', tend to rotate the pin and to roll it on the threads of the bolt. As all points of the inclined surface *c'* and, of course, the line E' thereof, in the rotation of the nut, will travel in a curved path concentric with the peripheral edges of the screw threads of the bolt, so that the line E' will travel in a path spaced at every point the same distance from said screw threads, any rotative movement of the nut, if such movement were possible, would shorten the distance G, that is to say, the distance between the lines of contact of the pin with the flat surface *c'* and with the threads of the bolt. Any shortening of this line manifestly is resisted and absolutely prevented by the compressive strength of the pin. Thus any rotation of the nut in the direction referred to is resisted and prevented by the pin which acts, notwithstanding its cylindric form, as a wedge. The same thing happens if the nut tends to turn in the opposite direction, namely, in the direction of the arrow *f'*.

In my patent hereinbefore referred to, a groove provided with a bottom having a concave surface was described and shown, but the difficulty with such construction is that by reason of the fact that the middle part of the bottom surface of said groove has a curvature concentric with the curvature of the peripheral edges of the bolt threads and also of the fact that the pin has but a single line of contact with the bottom of the groove, an appreciable turning movement of the nut on the bolt and rotative or rolling movement of the pin both on the threads of the bolt and on the bottom surface of the groove necessarily occurs before the pin becomes wedged between the concave bottom surface of the groove and the peripheral edges of the bolt threads. Thus in said prior construction the nut is not rigidly locked in a predetermined position against any movement whatever, as in the present case.

I have found that the angle of inclination of the surfaces forming the bottom of the groove is material for the efficient operation of my improved lock nut and prefer to make the angle of the inclined surfaces to a radial plane through the central axle of the bolt or of the bore of the nut, about 70°. If this angle were made materially more than 70° or the bottom surfaces of the groove were at a less inclination than shown, the nut would rotate the pin and roll it both upon the bolt threads and upon the bottom surface of the groove without immediately wedging the pin between the bottom of the groove and the threads of the bolt; if the angle were made materially less than 70° or the inclination of the bottom surface of the groove were much greater than shown, there would not be sufficient frictional grip between the bottom surface of the groove and the cylindric surface of the pin, with the result that the pin would slide or be pushed along rather than rolled upon the threads of the bolt and would fail entirely to become wedged between the bottom of the groove and the thread of the bolt so as to accomplish its intended function. In neither case would occur the initial gripping or locking action between the bottom surface of the groove and the cylindric surface of the pin. With the angle of inclination at substantially the degree mentioned, the pin is immediately gripped and wedged between the bottom surface of the groove and the threaded surface of the bolt the instant there is any tendency of the nut to turn or rotate upon the bolt in either direction. The nut is thus absolutely and rigidly locked against any movement whatever.

While the inclined surfaces, $c$, $c'$, forming the bottom surface of the groove are shown in the drawings arranged symmetrically with the deepest part of the groove located centrally between its lateral surfaces, manifestly, this is not essential.

In Fig. 4 I have shown a modified form of the device in which the groove is formed in the bolt or screw instead of the nut. In this case J indicates the groove which has oppositely inclined bottom surfaces $j$, $j'$, and lateral surfaces $j^2$, $j^2$. D indicates the pin, as before. The operation in this case is the same as in the case first described.

I claim as my invention:

1. A nut lock comprising in combination an externally threaded member and a member provided with an internally threaded bore engaged by said externally threaded member, one of said members being provided with a groove located adjacent the other member and extending parallel to the longitudinal central axis thereof, said groove having oppositely inclined bottom surfaces, and a pin located in said groove and engaging at one side against both of said inclined bottom surfaces along separated lines of contact and at its opposite side against the other threaded member.

2. A nut lock comprising in combination an externally threaded member, and a member provided with an internally threaded bore engaged by said externally threaded member, one of said members being provided with a groove located adjacent the other member and extending parallel to the longitudinal central axis thereof, said groove having bottom surfaces oppositely inclined at an angle of substantially 70° to a radial plane extending through the longitudinal central axis of said threaded members and a pin located in said groove and engaging at one side against both of said inclined bottom surfaces along separated lines of contact and at its opposite side against the other threaded member.

In testimony whereof I have signed this specification in the presence of two subscribing witnesses.

EDWARD W. TAYLOR.

Witnesses:

W. Story, Jr.,

A. E. Burdette.

Copies of this patent may be obtained for five cents each, by addressing the "Commissioner of Patents, Washington, D. C."